United States Patent
Seo et al.

(10) Patent No.: US 8,523,723 B2
(45) Date of Patent: *Sep. 3, 2013

(54) POWER TRAIN FOR HYBRID VEHICLE

(75) Inventors: Kangsoo Seo, Gyeonggi-do (KR); Hyutae Shim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 730 days.

This patent is subject to a terminal disclaimer.

(21) Appl. No.: 12/629,510

(22) Filed: Dec. 2, 2009

(65) Prior Publication Data

US 2010/0273596 A1    Oct. 28, 2010

(30) Foreign Application Priority Data

Apr. 23, 2009 (KR) .................. 10-2009-0035354

(51) Int. Cl.
*F16H 3/72* (2006.01)
*F16H 3/44* (2006.01)

(52) U.S. Cl.
USPC ............... 475/5; 475/275; 475/282; 475/317; 903/911

(58) Field of Classification Search
USPC .................................. 475/282, 317; 903/911
See application file for complete search history.

(56) References Cited

U.S. PATENT DOCUMENTS

2007/0225097 A1*  9/2007  Raghavan et al. ............... 475/5
2010/0273593 A1*  10/2010  Seo et al. ...................... 475/5

FOREIGN PATENT DOCUMENTS

| JP | 2004-345527 A | 12/2004 |
| JP | 2005-138803 A | 6/2005 |
| JP | 2007-314034 A | 12/2007 |
| JP | 2008-114812 A | 5/2008 |
| JP | 2008-120138 A | 5/2008 |
| KR | 10-2008-0032131 A | 4/2008 |

* cited by examiner

*Primary Examiner* — Edwin A Young
(74) *Attorney, Agent, or Firm* — Edwards Wildman Palmer LLP; Peter F. Corless

(57) ABSTRACT

A power train for a hybrid vehicle may include: a first planetary gear set that includes at least four rotary elements; a second planetary gear set that includes at least three rotary elements one of which is connected with at least one of the rotary elements of the first planetary gear set; a first clutch that is configured to connect/disconnect a rotary element of the first planetary gear set with/from a rotary element of the second planetary gear set; and a first brake that is provided to restrain rotation of a rotary element of the second planetary gear set, wherein at least two or more independent power sources and an output element are connected to the rotary elements of the first planetary gear set and the second planetary gear set.

14 Claims, 4 Drawing Sheets

| DRIVING MODE | | CL1 | CL2 | BK1 | BK2 |
|---|---|---|---|---|---|
| EV | EV1 | | | ● | |
| | EV2 | | ● | ● | |
| HEV | HEV1 | | | ● | |
| | HEV2 | ● | | | |
| FIXED GEAR RATIO | FIRST STAGE | ● | | ● | |
| | SECOND STAGE | ● | ● | | |
| | THIRD STAGE | ● | | | ● |

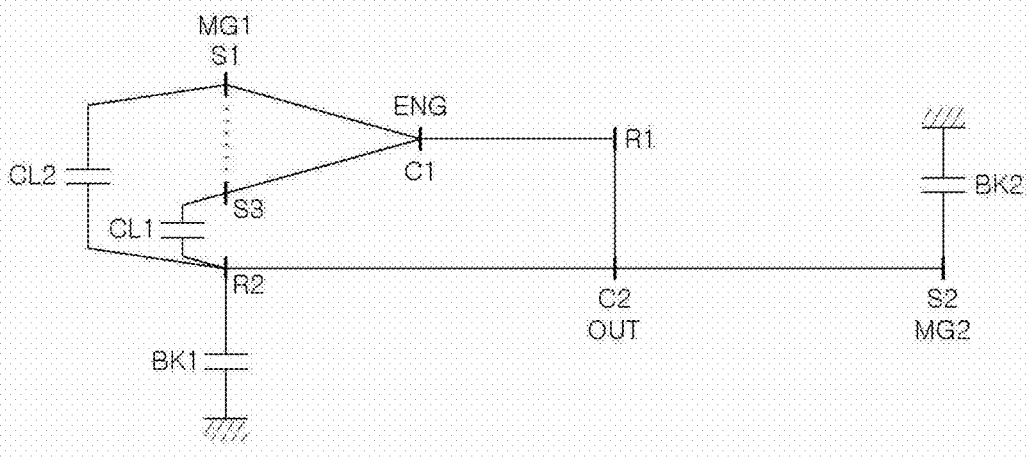

POWER TRAIN FOR HYBRID VEHICLE

CROSS-REFERENCE TO RELATED APPLICATIONS

The present application claims priority to Korean Patent Application Number 10-2009-0035353 filed Apr. 23, 2009, the entire contents of which application is incorporated herein for all purposes by this reference.

BACKGROUND

1. Technical Field

The present disclosure relates to a power train for a hybrid vehicle, in more detail a technology for transmitting power from power sources to the driving wheels in a hybrid vehicle equipped with two or more different power sources, including an internal combustion engine.

2. Related Art

Hybrid vehicles using an engine and a motor generator improve fuel efficiency of the vehicles by achieving functions of idle stop and regenerative braking, on the basis of a technology of driving the vehicles at low velocity by using power from the motor generator having relatively excellent low-velocity torque characteristics and driving the vehicles at high velocity by using power from the engine having relatively excellent high-velocity characteristics.

Further, hybrid vehicles do not produce exhaust gas from the engine when being driven only by a motor generator, which is recognized as an environmental-friendly vehicle technology having advantages of improving fuel efficiency and reducing exhaust gas.

The power train for hybrid vehicles is required to provide sufficient driving force and high fuel efficiency.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide a power train for a hybrid vehicle that can achieve a fixed gear ratio mode where a vehicle is driven at a fixed gear ratio, such as shift stages of common transmission, only by the driving force of an engine without driving a motor generator, as well as an electric vehicle mode and a hybrid mode that are basic driving modes of a hybrid vehicle, thereby driving the vehicle with high efficiency in accordance with traveling conditions of the vehicle and improving fuel efficiency.

In one aspect, the present invention provides a power train for a hybrid vehicle comprising: a first planetary gear set that includes at least four rotary elements; a second planetary gear set that includes at least three rotary elements one of which is connected with at least one of the rotary elements of the first planetary gear set; a first clutch that is configured to connect/disconnect a rotary element of the first planetary gear set with/from a rotary element of the second planetary gear set; and a first brake that is provided to restrain rotation of a rotary element of the second planetary gear set, wherein at least two or more independent power sources and an output element are connected to the rotary elements of the first planetary gear set and the second planetary gear set.

Preferably, the rotary element, the rotation of which is restrained by the first brake, of the second planetary gear set may be disconnectably connected to the rotary element of the first planetary gear set through the first clutch. In this case, the power source may include an engine and a first motor generator that are connected to the first planetary gear set, and a second motor generator that is connected to the second planetary gear set, and the output element may be connected to the second planetary gear set. Suitably, the engine, the first planetary gear set, the second planetary gear set, the first motor generator, and the second motor generator may be arranged such that rotary shafts overlap each other to form a single shaft. Suitably, the first planetary gear set may be a long pinion type planetary gear set including a first sun gear and a third sun gear that are independently engaged with one long pinion, and the second planetary gear set may be a single pinion planetary gear set including three rotary elements.

Preferably, a first ring gear of the first planetary gear set may be connected to a second carrier of the second planetary gear set, the third sun gear of the first planetary gear set may be connected to a second ring gear of the second planetary gear set through the first clutch, the engine may be connected to a first carrier of the first planetary gear set, the first motor generator may be connected to the first sun gear of the first planetary gear set, the second motor generator may be connected to a second sun gear of the second planetary gear set, the output element may be connected to a second carrier of the second planetary gear set, the first clutch may be configured to connect/disconnect the third sun gear of the first planetary gear set with/from the second ring gear of the second planetary gear set, and the first brake may be configured to restrain rotation of the second ring gear of the second planetary gear set. In this case, the long pinion of the first planetary gear set may have the same number of gear teeth at portions where the first sun gear and the third sun gear are engaged. Alternatively, the long pinion of the first planetary gear set may have the different numbers of teeth at portions where the first sun gear and the third sun gear are engaged.

Preferably, the first planetary gear set and the second planetary gear set may be disposed adjacent to each other, the first motor generator is disposed adjacent to the first planetary gear set and the second motor generator may be disposed adjacent to the second planetary gear set, such that with the first planetary gear set and the second planetary gear set are disposed between the first motor generator and the second motor generator, the output element may be connected to the outside through a space between the second motor generator and the second planetary gear set, and the first clutch may be provided to connect/disconnect the third sun gear of the first planetary gear set with/from the second ring gear of the second planetary gear set through a space between the first motor generator and the first planetary gear set. In this case, suitably, the power train may further comprise: a second brake that restrains rotation of the second sun gear of the second planetary gear set; and a second clutch that is provided between the first carrier of the first planetary gear set and the second ring gear of the second planetary gear set to restrain rotation therebetween.

Preferably, the first planetary gear set and the second planetary gear set may be disposed adjacent to each other, the first motor generator may be disposed to be connected to the second planetary gear set, the second motor generator may be disposed to be connected to the second planetary gear set such that the second motor generator is disposed between the second planetary gear set and the first motor generator, the output element may be connected to the outside through a space between the second motor generator and the second planetary gear set, and the first clutch may be configured to connect/ disconnect the third sun gear of the first planetary gear set with/from the second ring gear of the second planetary gear set through a space around the first planetary gear set. In this case, the power train may, suitably, further comprise: a second brake that restrains rotation of the second sun gear of the second planetary gear set; and a second clutch that is provided between the first carrier of the first planetary gear set and the second ring gear of the second planetary gear set to restrain rotation therebetween.

In another aspect, the present invention provides a power train for a hybrid vehicle, comprising: a first planetary gear set that includes at least four rotary elements; a second planetary gear set that includes two rotary elements that are disconnectably connected with two rotary elements of the first planetary gear set and a rotary element that is always connected to one of the other rotary elements of the first planetary gear set; a first brake that is configured to restrain rotation of a rotary elements of the second planetary gear set; and a second brake that is configured to restrain rotation of another rotary element of the second planetary gear set, wherein at least two or more independent power sources and an output element are connected to the rotary elements of the first planetary gear set and the second planetary gear set.

In this case, preferably, the power source may include an engine and a first motor generator that are connected to the first planetary gear set, and a second motor generator that is connected to the second planetary gear set, and the output element may be connected to the second planetary gear set. Suitably, the first planetary gear set may be a long pinion type planetary gear set including a first sun gear and a third sun gear that are independently engaged with one long pinion, and the second planetary gear set may be a single pinion planetary gear set including three rotary elements. Preferably, a second ring gear of the second planetary gear set may be disconnectably connected with the third sun gear of the first planetary gear set by a first clutch and disconnectably connected with a first carrier of the first planetary gear set by a second clutch. In this case, a second carrier of the second planetary gear set may be always connected with a first ring gear of the first planetary gear set and connected to the output element, and the second ring gear of the second planetary gear set may be connected such that rotation is restrained by the first brake. Further, suitably, the engine may be connected to the first carrier of the first planetary gear set, the first motor generator may be connected to the first sun gear of the first planetary gear set, the second motor generator may be connected to the second sun gear of the second planetary gear set, and the second brake may be configured to restrain rotation of the second sun gear of the second planetary gear set. In this case, the long pinion of the first planetary gear set may have the same number or different numbers of gear teeth at portions where the first sun gear and the third sun gear are engaged.

According to the present invention, a power train for a hybrid vehicle can achieve a fixed gear ratio mode where a vehicle is driven at a fixed gear ratio, such as shift stages of common transmission, only by the driving force of an engine without driving a motor generator, as well as an electric vehicle mode and a hybrid mode that are basic driving modes of a hybrid vehicle, such that it is possible to drive the vehicle with high efficiency in accordance with traveling conditions of the vehicle and improve fuel efficiency.

Further, the present invention can provide a power train for a hybrid vehicle that makes it possible to set the number of teeth of a sun gear and a pinion of a planetary gear set, which is a component, in various ways, such that it is possible to more freely select the capacity of a clutch or a motor generator and design a compact transmission.

The above and other features and advantages will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 7 is a lever analysis diagram of the power train of FIG. 5.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
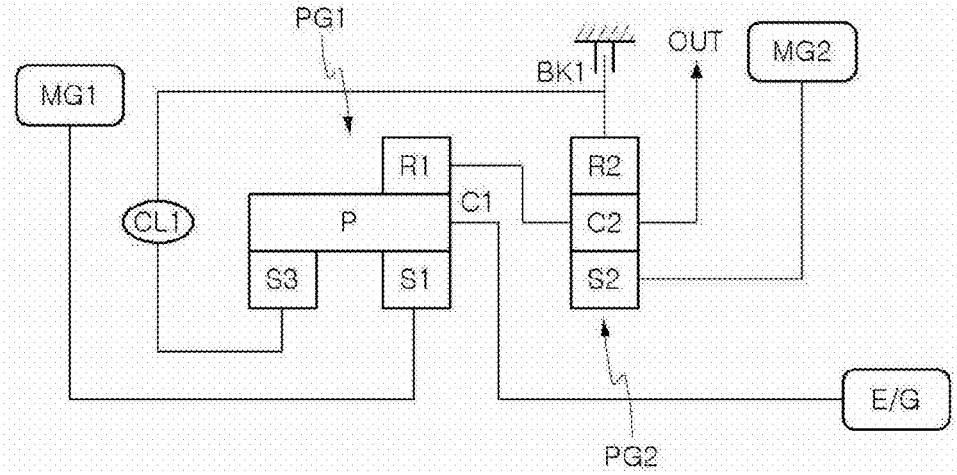
FIG. 1 is a diagram illustrating the structure of a power train for a hybrid vehicle according to an embodiment of the present invention.
Figure 2:
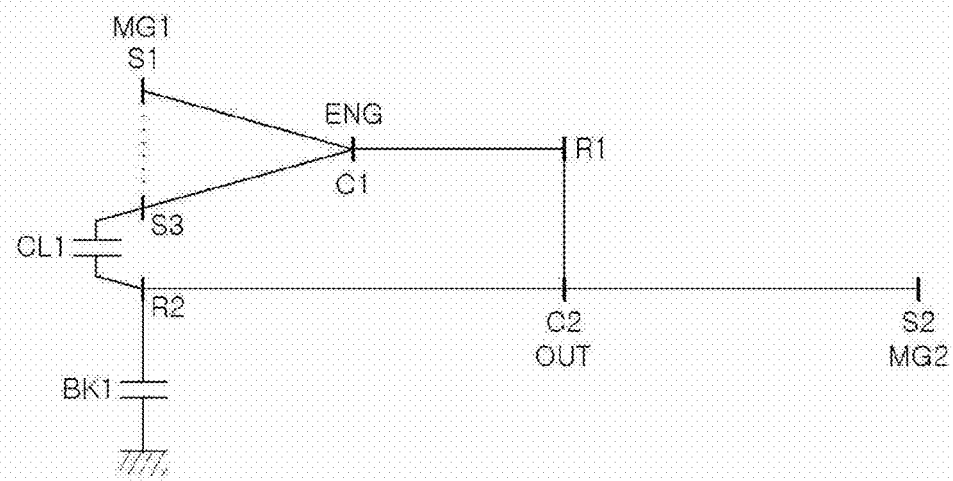
FIG. 2 is a lever analysis diagram of the power train of FIG. 1.

Referring to FIGS. 1 and 2, a power train for a hybrid vehicle according to an embodiment of the present invention includes: a first planetary gear set PG1 that includes at least four rotary elements; a second planetary gear set PG2 that includes at least three rotary elements one of which is connected with at least one of the rotary elements of the first planetary gear set PG1; a first clutch CL1 that is provided to connect/disconnect one rotary element of the first planetary gear set PG1 with/from one rotary element of the second planetary gear set PG2; and a first brake BK1 that is provided to restrain rotation of one rotary element of the second planetary gear set PG2. At least two or more independent power sources and an output element OUT are connected to the rotary elements of the first planetary gear set PG1 and the second planetary gear set PG2.

Preferably, the rotary element, the rotation of which is restrained by the first brake BK1, of the second planetary gear set PG2 is disconnectably connected to the rotary element of the first planetary gear set PG1 through the first clutch CL1.

The power source includes an engine E/G and a first motor generator MG1 that are connected to the first planetary gear set PG1, and a second motor generator MG2 that is connected to the second planetary gear set PG2, and the output element OUT is connected to the second planetary gear set PG2.

The engine E/G, the first planetary gear set PG1, the second planetary gear set PG2, the first motor generator MG1, and the second motor generator MG2 are arranged such that their rotary shafts overlap each other to form a single shaft.

Suitably, the first planetary gear set PG1 is a long pinion type planetary gear set including a first sun gear S1 and a third sun gear S3 that are independently engaged with one long pinion and the second planetary gear set PG2 is a single pinion planetary gear set including three rotary elements.

That is, suitably, a first ring gear R1 of the first planetary gear set PG1 is connected to a second carrier C2 of the second planetary gear set PG2, the third sun gear S3 of the first planetary gear set PG1 is connected to a second ring gear R2 of the second planetary gear set PG2 through the first clutch CL1, the engine E/G is connected to a first carrier C1 of the first planetary gear set PG1, the first motor generator MG1 is connected to the first sun gear S1 of first planetary gear set PG1, the second motor generator MG2 is connected to a second sun gear S2 of the second planetary gear set PG2, the output element OUT is connected to the second carrier C2 of the second planetary gear set PG2, the first clutch CL1 is disposed to connect/disconnect the third sun gear S3 of the first planetary gear set PG1 with/from the second ring gear R2 of the second planetary gear set PG2 and the first brake BK1 is disposed to restrain rotation of the second ring gear R2 of the second planetary gear set PG2.

In a power train according to an embodiment of the present invention, as shown in FIG. 1, the first planetary gear set PG1 and the second planetary gear set PG2 are disposed adjacent to each other, the first motor generator MG1 is disposed adjacent to the first planetary gear set PG1, and the second motor generator MG2 is disposed adjacent to the second planetary gear set PG2 such that the first planetary gear set PG1 and the second planetary gear set PG2 disposed between the first motor generator MG1 and the second motor generator MG2. The output element OUT is connected to the outside through a space between the first motor generator MG1 and the second motor generator MG2, the first clutch CL1 is connected to connect/disconnect the third sun gear S3 of the first planetary gear set PG1 with/from the second ring gear R2 of the second planetary gear set PG2 through a space between the first motor generator MG1 and the first planetary gear set PG1.

Figure 3:
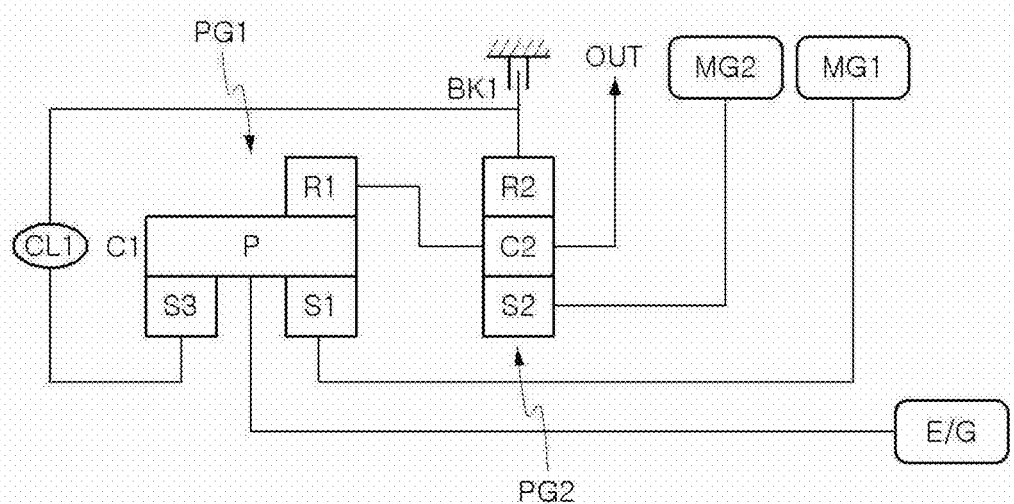
FIG. 3 is a diagram illustrating a modified example of the power train of FIG. 1.

As shown in FIG. 3, in a modified example of the power train of FIG. 1, the first planetary gear set PG1 and the second planetary gear set PG2 are disposed adjacent to each other, the first motor generator MG1 is disposed to be connected to the second planetary gear set PG2, the second motor generator MG2 is disposed to be connected to the second planetary gear set PG2 such that the second motor generator MG2 is disposed between the second planetary gear set PG2 and the first motor generator MG1. The output element OUT is connected to the outside through a space between the second motor generator MG2 and the second planetary gear set PG2, the first clutch CL1 is disposed to connect/disconnect the third sun gear S3 of the first planetary gear set PG1 with/from the second ring gear R2 of the second planetary gear set PG2 through a space around the first planetary gear set PG1.

In the embodiments of FIG. 1 and FIG. 3 described above, preferably, the long pinion of the first planetary gear set PG1 has the same number of gear teeth at the portions where the first sun gear S1 and the third sun gear S3 are engaged, and it is designated by P in the embodiments of FIG. 1 and FIG. 3 and an embodiment of FIG. 5 which is described below. On the other hand, in an embodiment shown in FIG. 4, preferably, the long pinion of the first planetary gear set PG1 has different numbers of teeth at the portions where the first sun gear S1 and the third sun gear S3 are engaged.

Figure 4:
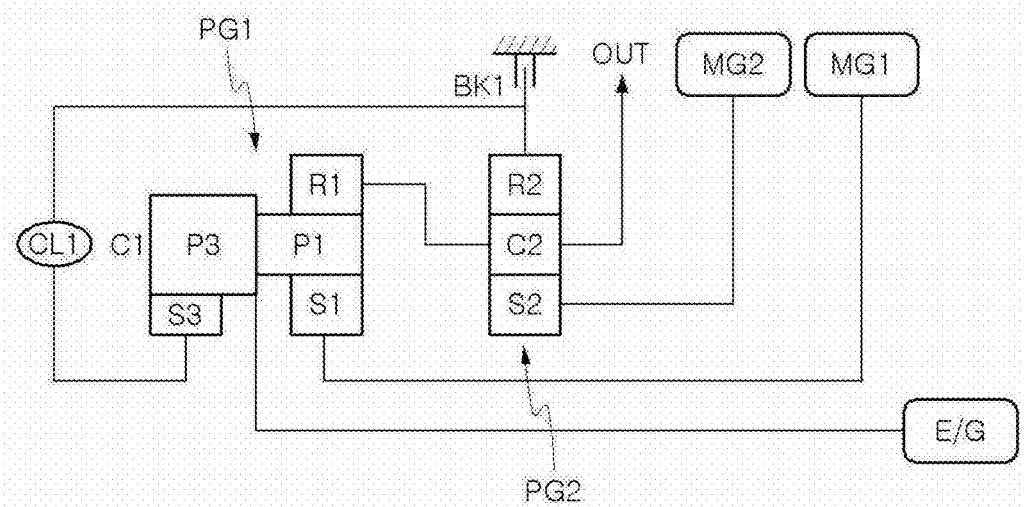
FIG. 4 is a diagram illustrating another modified example of the power train of FIG. 1.

As shown in FIG. 4, in another modified example of the power train of FIG. 1, in the long pinion of the first planetary gear set PG1, the portions with different numbers of teeth are integrally formed with steps of a first pinion portion P1 and a third pinion portion P3 and it is possible to independently set the relationship of the number of gear teeth between the first pinion portion P1 and the first sun gear S1 and the relationship of the number of gear teeth between the third pinion portion P3 and the third sun gear S3, when the first sun gear S1 and the third sun gear S3 are engaged. Therefore, it is possible to design the capacity of the first motor generator MG1 connected to the first sun gear S1 while adjusting the relationship of the number of gear teeth between the first pinion portion P1 and the first sun gear S1 and to design the capacity of the first clutch CL1 connected to the third sun gear S3 while adjusting the relationship of the number of gear teeth between the third pinion portion P3 and the third sun gear S3, which allows for free design such that a compact transmission can be designed.

Figures 5, 6:
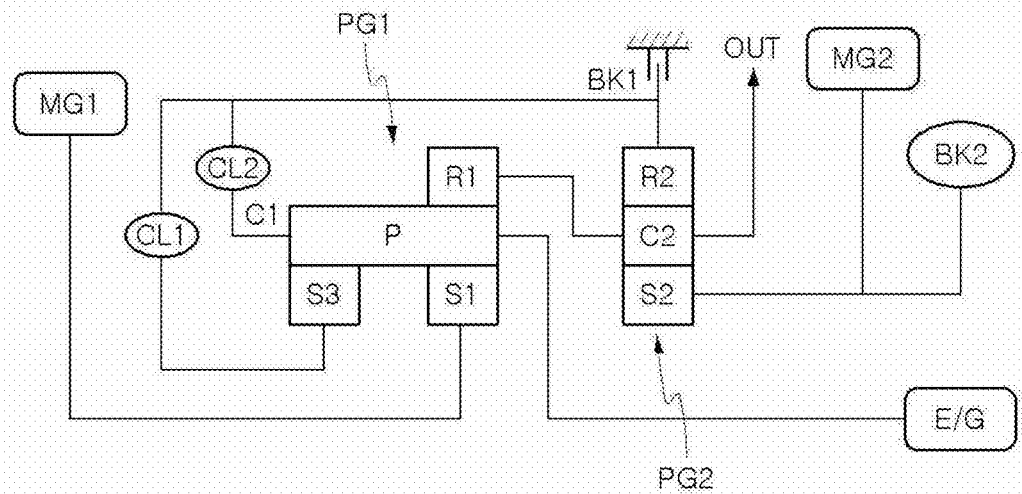
FIG. 5 is a diagram illustrating the structure of a power train for a hybrid vehicle according to another embodiment of the present invention.
FIG. 6 is a driving mode table of the power train of FIG. 5.

A power train according to another embodiment of the present invention, as shown in FIG. 5, further includes a second brake BK2 that restrains rotation of the second sun gear S2 of the second planetary gear set PG2 and a second clutch CL2 provided between the first carrier C1 of the first planetary gear set PG1 and the second ring gear R2 of the second planetary gear set PG2 to restrain rotation between them. Description of the other components is omitted since they are the same as those of the power train of FIG. 1.

As shown in the driving mode table of FIG. 6, the power train according to this embodiment can be operated in various driving modes: an electric vehicle (EV) mode, a hybrid (HEV) mode, and a fixed gear mode.

The EV mode allows for an EV1 mode that is achieved by engaging only the first brake BK1 and an EV2 mode that is achieved by engaging the second clutch CL2 and the first brake BK1.

The HEV mode allows for an HEV 1 mode that is achieved by engaging the first brake BK1 and an HEV2 mode that is achieved by engaging the first clutch CL1.

The fixed gear ratio mode can be operated in first to third stages at respective predetermined shift ratios while only the engine E/G is operated, as shown in the table.

It is possible to improve fuel efficiency while effectively driving the hybrid vehicle by appropriately combining various driving modes in accordance with traveling conditions of a vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle comprising:
a first planetary gear set that includes a first ring gear, a first carrier, a first sun gear and a third sun gear, wherein the first carrier is directly connected to an engine and the first sun gear is directly connected to a first motor generator;
a second planetary gear set that includes a second ring gear, a second carrier and a second sun gear wherein the second carrier is directly connected to the first ring gear, the second sun gear is directly connected to a second motor generator and the second carrier is directly connected to an output element;

a first clutch configured to selectively engage and disengage the third sun gear with the second ring gear; and a first brake configured to restrain the rotation of the second ring gear.

2. The power train for a hybrid vehicle as defined in claim 1, wherein the first planetary gear set is a long pinion type planetary gear set and the first sun gear and the third sun gear are independently engaged with one long pinion, and the second planetary gear set is a single pinion planetary gear set.

3. The power train for a hybrid vehicle as defined in claim 2, wherein the long pinion of the first planetary gear set has the same number of gear teeth at portions where the first sun gear and the third sun gear are engaged.

4. The power train for a hybrid vehicle as defined in claim 3, wherein:
the first planetary gear set and the second planetary gear set are disposed adjacent to each other;
the first motor generator is disposed adjacent to the first planetary gear set and the second motor generator is disposed adjacent to the second planetary gear set, such that the first planetary gear set and the second planetary gear set are disposed between the first motor generator and the second motor generator;
the output element is connected to the outside through a space between the second motor generator and the second planetary gear set; and
the first clutch is provided to connect/disconnect the third sun gear of the first planetary gear set with/from the second ring gear of the second planetary gear set through a space between the first motor generator and the first planetary gear set.

5. The power train for a hybrid vehicle as defined in claim 4, further comprising:
a second brake that restrains rotation of the second sun gear of the second planetary gear set; and
a second clutch that is provided between the first carrier of the first planetary gear set and the second ring gear of the second planetary gear set to restrain rotation therebetween.

6. The power train for a hybrid vehicle as defined in claim 3, wherein:
the first planetary gear set and the second planetary gear set are disposed adjacent to each other;
the first motor generator is disposed to be connected to the first planetary gear set;
the second motor generator is disposed to be connected to the second planetary gear set such that the second motor generator is disposed between the second planetary gear set and the first motor generator;
the output element is connected to the outside through a space between the second motor generator and the second planetary gear set; and
the first clutch is configured to connect/disconnect the third sun gear of the first planetary gear set with/from the second ring gear of the second planetary gear set through a space around the first planetary gear set.

7. The power train for a hybrid vehicle as defined in claim 2, wherein the long pinion of the first planetary gear set has different numbers of teeth at portions where the first sun gear and the third sun gear are engaged.

8. A power train for a hybrid vehicle, comprising:
a first planetary gear set that includes at least four rotary elements;
a second planetary gear set that includes one rotary element that is disconnectably connected with two rotary elements of the first planetary gear set and a rotary element that is always connected to one of the other rotary elements of the first planetary gear set;
a first brake that is configured to restrain rotation of a rotary element of the second planetary gear set; and
a second brake that is configured to restrain rotation of another rotary element of the second planetary gear set,
wherein at least two or more independent power sources and an output element are connected to the rotary elements of the first planetary gear set and the second planetary gear set.

9. The power train for a hybrid vehicle as defined in claim 8, wherein the two or more power sources include an engine and a first motor generator that are connected to the first planetary gear set, and a second motor generator that is connected to the second planetary gear set, and wherein the output element is connected to the second planetary gear set.

10. The power train for a hybrid vehicle as defined in claim 9, wherein the first planetary gear set is a long pinion type planetary gear set including a first sun gear and a third sun gear that are independently engaged with one long pinion, and the second planetary gear set is a single pinion planetary gear set including three rotary elements.

11. The power train for a hybrid vehicle as defined in claim 10, wherein a second ring gear of the second planetary gear set is disconnectably connected with the third sun gear of the first planetary gear set by a first clutch and disconnectably connected with a first carrier of the first planetary gear set by a second clutch.

12. The power train for a hybrid vehicle as defined in claim 11, wherein a second carrier of the second planetary gear set is always connected with a first ring gear of the first planetary gear set and connected to the output element, and the second ring gear of the second planetary gear set is connected such that rotation is restrained by the first brake.

13. The power train for a hybrid vehicle as defined in claim 12, wherein:
the engine is connected to the first carrier of the first planetary gear set;
the first motor generator is connected to the first sun gear of the first planetary gear set;
the second motor generator is connected to the second sun gear of the second planetary gear set; and
the second brake is configured to restrain rotation of the second sun gear of the second planetary gear set.

14. The power train for a hybrid vehicle as defined in claim 13, wherein the long pinion of the first planetary gear set has the same number of gear teeth at portions where the first sun gear and the third sun gear are engaged.

* * * * *